United States Patent Office 3,347,372
Patented Oct. 17, 1967

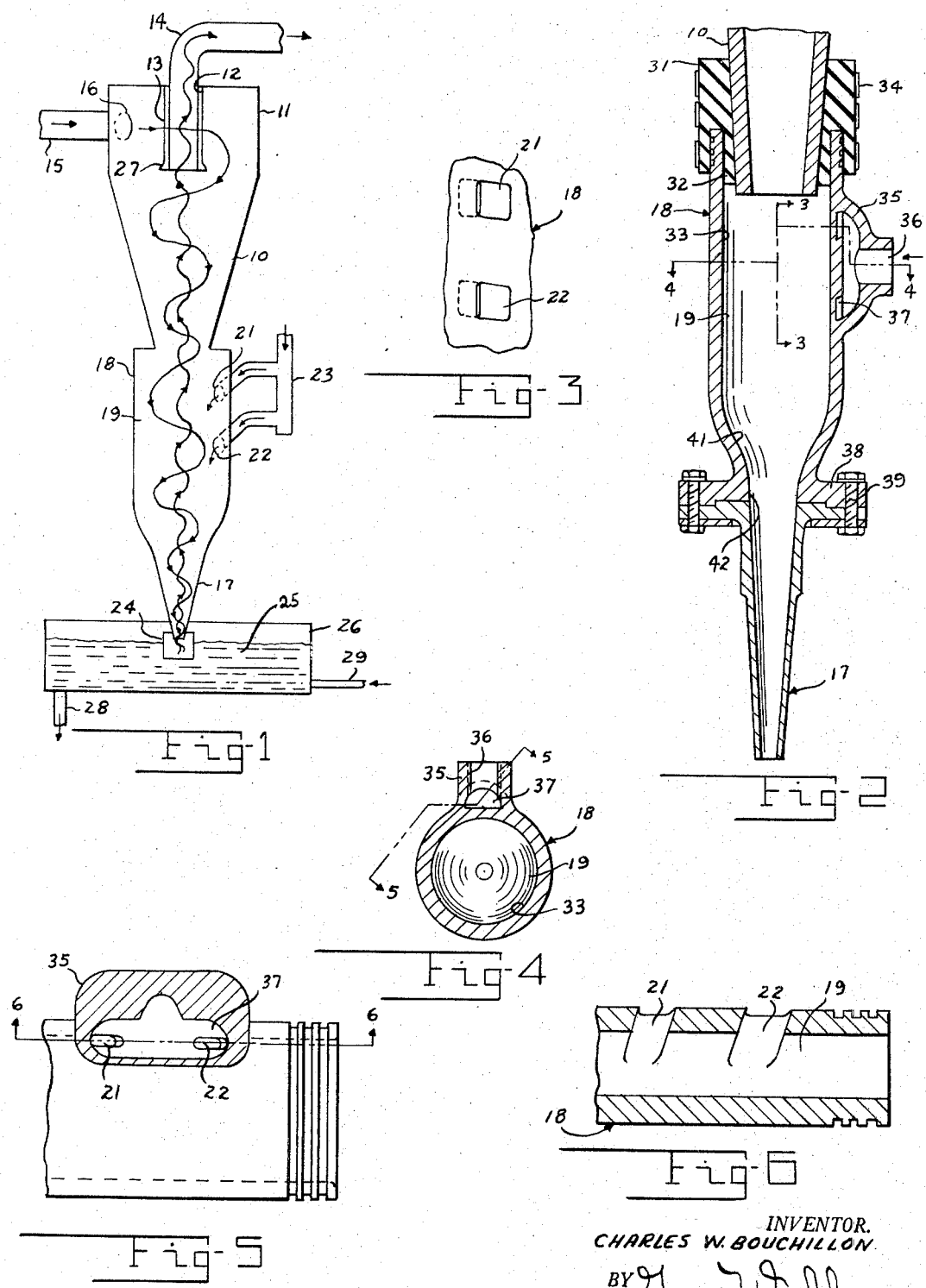

3,347,372
CENTRIFUGAL CLEANER
Charles W. Bouchillon, State College, Miss., assignor to The Bauer Bros. Co., Springfield, Ohio, a corporation of Ohio
Continuation of abandoned application Ser. No. 246,211, Dec. 20, 1962. This application May 20, 1966, Ser. No. 560,031
7 Claims. (Cl. 209—211)

This invention relates to improvements in hydrocyclonic separators. It constitutes a continuation of that disclosed in my copending application Serial No. 246,211 filed December 20, 1962 for Centrifugal Cleaner now abandoned.

Invention embodiments are characterized by a segmented or sectionalized form. In each case their base and apex portions are axially spaced by a longitudinally extended uniquely formed shell. The shell defines an elutriation chamber the position and characteristics of which produce a significant increase in the operational efficiency of a cyclone separator. As a matter of fact, there are many functional byproducts which enable in the use thereof a distinct advance in the separating art, particularly in the field of pulp refining as will be here described.

As applied to pulp slurrys, conventional cyclone separators tend to discharge a significant amount of usable fiber with the rejects. This necessitates a repeated cycling of the rejects in efforts to regain additional usable fiber. As will be obvious, there is therefore an inherent problem in the use of conventional cyclone separators due to their relatively low separating efficiency. The present invention affords a definite solution to this problem, the use thereof causing the separating efficiency of a separator to be significantly raised and its function to approach an optimal condition.

To review the prior art, hydrocyclonic separators function to separate a flowing liquid suspension, for example paper pulp in a water carrier into accepted and rejected fractions. Commonly having a generally conical configuration, the separator admits the suspension in its base end and in a tangentially directed stream. This stream moves inwardly of the separator per se, following a helical path, under conditions of increasing velocity and centrifugal force, towards its opposite or apex end. In the process, the suspension tends to separate into counter flowing vortices. Large and heavy particles and dirt embodied in the carrier move toward the wall of the separator chamber and continue to the apex end of the separator in what may be considered an outer vortex. Relatively light and clean materials move inwardly toward the axis of the separator to entrain in an inner vortex moving counter to the outer vortex, that is in a direction away from the apex and to the base end of the separator. An overflow nozzle in the base or overflow end of the separator is positioned to receive and deliver from the separator a discharge from the counter flowing inner vortex which constitutes the accepts or dirt poor portion of a suspension. The outer vortex carries the rejects or dirt rich fraction of the suspension to exit from the separator by way of its apex end. Optimally all usable materials should exit with the accepts and rejectable materials with the rejects. However, as indicated above, this has not been the case in the prior art hydrocyclone type separators.

It is therefore an object of the invention to improve the construction as well as the means and mode of operation of centrifugal separators whereby such separators may not only be economically manufactured, but will be more efficient and satisfactory in use, adaptable to a wide variety of applications and be unlikely to malfunction.

A further object of the invention is to provide means for increasing the efficiency of a hydrocyclone as described, to the ends of promoting a sharper separation therein between rejectable and usable materials and reducing the amount of usable or acceptable materials normally discharged with the rejected fractions.

Another object of the invention is to achieve an improved separating efficiency in a hydrocyclone as described through the use of an intermediately inserted elutriation section of distinctive character.

A further object of the invention is to provide a generally new sectionalized hydrocyclone apparatus characterized by improvements at both its overflow and underflow ends as well as intermediately thereof, the latter including means defining an axially extended elutriation section producing a more effective reclamation of usable material in the operation thereof.

An additional object of the invention is to provide an axially projected insert portion intermediate the base and apex ends of a hydrocyclone to define thereby an integrated elutriation chamber of generally cylindrical form which is located immediately in advance of the underflow nozzle at the apex and characterized by means insuring that the water entering said insert for elutriation purposes joins the natural flow of the materials within said hydrocyclone in a manner to produce a minimum disturbance of the established flow pattern.

A still further object of the invention is to provide in a separator of the cyclone type means for extracting a maximum of acceptable material from the suspension of solids in liquid which is passed through said separator.

A further object of the invention is to provide a new sectionalized centrifugal separator possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a generally schematic diagram of hydrocyclonic apparatus in accordance with the illustrated embodiment of the invention;

FIG. 2 is a detailed fragmentary view of the hydrocyclone of FIG. 1, showing the lower or underflow end thereof;

FIG. 3 is a fragmentary view in longitudinal section, taken substantially along the line 3—3 of FIG. 2;

FIG. 4 is a view in cross-section, taken substantially along the irregular line 4—4 of FIG. 2;

FIG. 5 is a sectional view, taken substantially along the irregular line 5—5 of FIG. 4; and FIG. 6 is a view in longitudinal section, taken substantially along the line 6—6 of FIG. 5.

Like parts are indicated by similar characters of reference throughout the several views.

Referring to the drawings, the invention is illustratively embodied in a hydrocyclonic separator adapted for the "cleaning" of wood pulp carried in a liquid suspension, forming a slurry. In accordance with the separation process, relatively light and clean usable fibers are segregated from the slurry as "accepts" while dirt and undesirable fibrous material is allowed to pass to waste or to subsequent recovery apparatus as "rejects."

Considering first the diagram of FIG. 1, the structure of the hydrocyclone shown includes a hollow truncated cone section 10 having at its base end a concentric cylindrical section 11 of limited axial extent. One end of the section 11 is open so that it serves as a continuing part of the base end of the cone section. The opposite end of the section 11 is closed except for a central opening 12. A vortex finder in the form of a cylindrical tube 13 is fitted to the closed end of the section 11 to align with and define, at one end thereof, the opening 12 and to project coaxially to have its other end extend to the open end of the section 11. A pipe or like fitting connects to form an extension of the tube 13 outside the hydrocyclone proper.

As a pulp slurry in the form of a liquid suspension containing dirt and both usable and unusable fibers is delivered to the hydrocyclone through a duct 15, it enters the section 11 by way of a tangentially disposed opening 16. Due to this tangential entry, as the liquid suspension moves inwardly of the separator, it develops a rotary motion inducing a gradual progression thereof toward the apex or reduced end portion of the cone section 10. An outer vortex is so established which is conducive to the creation of a second, inner vortex of flowing liquid which moves counter to the inflow. The inner vortex travels away from the apex end of the separator and toward its base end to seek entry to the finder tube 13 and to flow away from the separator by way of the fitting 14.

Thus, in the operation of the system, there is thereby produced in the cone section 10 concentric counterflowing liquid vortices which surround a centrally located liquid free core.

In this process, above described, forces are developed which result in a pressure differential being applied radially inward of the separator wall and toward the liquid free core. In combination with this pressure differential, the developed flow pattern causes the lightweight usable fibers to tend to separate from the flowing suspension of the outer vortex and to be drawn into the inner vortex. Carrying dirt and relatively large and heavy solids, the remaining portion of the suspension in the outer vortex continues to the apex end of the separator cone.

In accordance with the instant invention, the conical portion of the separator may be considered as comprised of separate sections inasmuch as the tip or nozzle portion 17 thereof is axially spaced from the section 10. Being a continuation of the cone section 10, the base or larger end of the nozzle section 17 corresponds in its inner diameter approximately to the inner diameter of the most adjacent end of the cone section 10. Establishing and maintaining the separated relation of the described cone sections is an interposed cylindrical section 18 defining an axially projected elutriation chamber 19. The cylinder 18 is equipped with longitudinally spaced openings 21 and 22. A conduit 23 serves as a means for introducing supplemental water to the chamber 19 by way of the openings 21 and 22 in a manner to be further described. The function of the supplemental water is to join the swirling vortex which enters the cylinder from the apex end of the cone section 10 and to displace additional usable fibers from the outer to the inner vortex where they are conducted as described in a counterflow to the tube finder 13 and out of the separator apparatus by way of the fitting 14. The remaining portion of the liquid suspension, including entrained dirt, unusable fibers and whatever light usable fibers may not yet have been entrained in the inner vortex, is guided to the base end of nozzle 17 and through the nozzle where it continues its swirling motion to and through its apex end.

The latter may communicate with the atmosphere or with an area of subatmospheric pressure but in accordance with another feature of the invention, as in the illustrated instance, it is submerged, either directly or through a sight glass 24, in a body of liquid 25 which is contained in a tank 26. The rejected fraction of the liquid suspension flows from the tip of nozzle 17 into the body 25.

It is a characteristic of invention apparatus that it functions in the discharge of the rejected fraction to the body 25 to cause additional usable fibers to be reclaimed in originating portions of the inner vortex. Such additional fibers are drawn back into the tip of the nozzle 17 and conducted along with other usable fibers to exit from the separator by way of the tube 13. It is not clearly understood how this occurs, but it appears there is an insuction at the apex end of the nozzle 17 which inherently causes the reclamation of light usable fibers but is not of a character to be able to draw back to the inner vortex the heavier dirt fractions.

An assisting structure in the function of the invention apparatus is an exterior bell-shaped configuration on the mouth of the vortex finding tube 13. As indicated in the drawings, at its inner extremity this tube has a downwardly expanding tapered portion providing an external enlargement of the solid body which defines the mouth of the tube 13. Due to this tapering enlargement, the bell-shaped configuration on the tube 13 causes a deflection of the suspension entering the section 11 of the separator in a sense away from the mouth of the finder tube. This obviates a short circuiting of dirt rich portions of the suspension into the mouth of the tube. This structure serves also, in a manner not fully understood, but proven in practice, as a means which obviates substantial insuction of liquid at the apex end of the separator. For this reason, the bell shape on the exterior of the tube 13 makes it possible to operate the separator with the apex end submerged. In this manner there is avoided such problems as are inherent in the drawing through the apex of the separator of excess air. Moreover, the structure avoids the need for vacuum and like connections to the separator.

As a result of the construction above described, the separator becomes more efficient, creates sharper separation of materials and inhibits any insuction of objectionable amounts of air and rejects back into the separator proper by way of its underflow nozzle portion 17.

As far as the dirt enriched water 25, this may be periodically or continuously drawn off and replaced by respective liquid flow conduits 28 and 29.

The vortex finder 13 and the conical tip section 17 may be respectively described as overflow and underflow nozzles. Thus, the accepted fraction of the liquid suspension has access as described to the overflow nozzle and is conducted thereby to and through the fitting 14 to a place of use or a subsequent process step. The rejected fraction correspondingly exits by way of underflow nozzle 17 and is dispersed in the body of water 25 to flow therewith to waste or to a subsequent recovery step. It is to be understood that the terms "underflow" and "overflow" connote attitude or position and similar terms may be used herein as for example in describing the flow of the outer vortex downward and the flow of the inner vortex upward. It is not intended however that these terms should be restrictive since the separator can be used in attitudes other than the one illustrated. The pressures involved within the separator are productive of centrifugal and other forces which make the operation of the device largely independent of gravity.

To refer more particularly to inventive features, the axially projected and relatively extended elutriation chamber, as shown in the drawings, has the effect of reducing the amount of usuable fiber in the rejects and at the same time of promoting a sharper separation between dirt and usuable fiber, as a result of which the separating efficiency must inherently improve. Considering the cylindrical extension 18 and the chamber 19 in greater detail, as seen in FIGS. 2 through 6, section 18 does have an axially extended relatively cylindrical form at is one end which receives the apex end of the cone section 10. A coupling 31 made of a rubber or rubberlike product embraces the interfitting ends of the cone section 10 and the cylindrical portion of the section 18. The coupling includes an innersleeve portion 32 which projects between the cylindrical section and the apex or connecting end of the cone section 10 in a manner to hold the latter centered in a position laterally spaced from the interior wall 33 of section 18. Suitable means such as hose clamps 34 about the outer sleeve portion which surrounds the interconnected end of the section 18 hold the coupling in place and maintain an assembled relation of the cone section 10, cylindrical section 18 and the coupling 31.

The supply passage 23 of the diagram of FIG. 1 is in the structural embodiment of FIG. 2 shown to be comprised of a manifold 35. The latter is formed integrally with the one end of the cylindrical portion of the section 18 and, as seen in FIG. 2, is positioned to the upper end of the chamber 19 and immediately adjacent the lowermost end of the cone section 10. The manifold has an inlet opening 36 and forms with the section 18 a chamber 37. Openings 21 and 22 in the wall of the chamber 19 are in common communication with the inlet opening 36 through the manifold chamber 37.

The openings 21 and 22 are, as described in connection with FIG. 1 and as particularly shown in FIGS. 4-6, disposed for a tangential discharge into the chamber 19. They are, moreover, inclined downward toward the nozzle 17 at a selected angle, as for example 20°. Accordingly, water admitted to the elutriation device by way of inlet opening 36 fills the manifold chamber 37 and is simultaneously discharged through the openings 21 and 22 in tangentially downwardly directed paths. It is noted, observing the drawings, that the liquid suspension in entering the chamber 19 emerges from the lower end of cone section 10 and in the process thereof the outer vortex produced in the section 10 tends to expand into the larger diameter of the coupled end of the cylindrical section 18. The angle of entrance of the elutriation water is such to join the natural flow of this outer vortex of the separator as it emerges from the reduced end of the cone section 10. It so enters or mingles with this expanding vortex that there is a minimum disturbance to the flow pattern which is originally established in the separator per se. Addition of the supplemental liquid by way of the openings 21 and 22 does in fact achieve a dilution effect and tends to induce usuable fibers in the outer vortex of the suspension to be yielded up to the counterflowing rising inner vortex.

At is end opposite that receiving the lowermost end of the cone section 10, the cylindrical section 18 is formed with a flange 38 to which the nozzle section 17 is detachably secured, as by clamp means 39. Immediately in advance of flange 38 the cylindrical form of the axially extended chamber 19 is modified to taper to a relatively reduced diameter, with the bore or inner wall 33 of the cylindrical extension assuming a gradually sloping surface 41. Such surface terminates in an opening 42 which is aligned with and corresponds in diameter to the open base end of nozzle 17. Accordingly, as the outer vortex flow moves to exit from the chamber 19 it is recompressed. Moreover, as the flow proceeds to and through the nozzle 17 it is further compressed as the diameter of the nozzle section is progessively decreased. It is a result of the system as described embodying the downwardly inclined entrance of elutriation water in the chamber 19 that there is a continuing release of usable fibers induced in the progressively compressed swirling liquid of the outer vortex through the period the liquid moves through the nozzle section 17. Moreover, there is a continuing release of usable fibers, discovered in practice, which takes place up to and beyond the apex or discharge end of the nozzle 17. Some usable fiber being drawn back into the separator even after discharge from the nozzle as heretofore described.

The hydrocyclonic apparatus may be successfully operated with the reject nozzle 17 exposed to atmosphere or it may be operated with the nozzle submerged as illustrated in FIG. 1. In either case, the addition of the bell-shaped or similar overflow nozzle 13 helps to impart an improved separator operation. There is a sharper separation of accepted and rejected fractions and an obviating of the drawing back into the separator of discharged dirt rich fractions. It is of course apparent, that operation of the apparatus is subject to applied variables as determined in part by the type of pulp to which the separator may be applied. Thus, a variation in rate of flow of the dilution water which enters the cylindrical section 18 may provide different results with different type pulps. The principles involved, nevertheless, still remain the same and have similar results in their use.

It has been found that with the integration of the hydrocyclonic separator and the stock saver as represented by the elutriation device, there is produced a system capable of drawing into itself liquid from the rejects tank when the nozzle is submerged. In such case the indrawn liquid is dispersed within the chamber 19 and there diluted. At the same time some of the usable fiber which may exist in the rejects is induced to move to the inner vortex and reclaimed. However, it is a characteristic of the use of this system that dirt fractions are generally not drawn in the same manner through the overflow nozzle.

In the case of a submerged cleaner, an underflow nozzle with a larger diameter apex end may be used to allow more of the reject material and dirt to escape into the rejects tank with greater ease.

To give some idea of the technical aspects of the use of the elutriation section 18, when a suspension fraction enters the section 18, it is generally in a concentrated form as originally admitted at the inlet 16. On expanding in entry to the chamber 19, however, such expansion occurs in a manner tending to free entrained usable fibers of compacting pressures. Upon orderly admission of the supplemental liquid, the expanding suspension flow has diluting liquid thoroughly mixed therewith. Thus with continuing vortiginous flow, we therefore find an optimal transition of clean liquid and usable fibers to the rising inner vortex which is directed toward the overflow nozzle 13.

Further, it is found to be characteristic that at the point of final discharge into tank 26 separate vortices continue to be defined, thus accounting for the fact that usable fibers may be reclaimed even after the suspension exits from the nozzle 17. There is thereby defined a returning water column which is established to extend to and through the apex end of the overflow nozzle with acceptable stock being transferred through said column the length thereof to the finder tube 13.

To emphasize and distinguish the present invention from the efforts to solve the subject problem in the prior art, one may look to patents such as Fontein, Serial No. 2,590,691. Here the problem was faced of a need for reducing the amount of relatively fine particles which leave the apex end of the cyclone. Fontein proposed that it be accomplished by introducing into the apex of the cyclone per se a stream of liquid in a direction counter to the discharge direction to thereby drive relatively small particles back into the cyclone. For this purpose he proposed to couple a second cyclone as a receiver for the materials discharged from the reject end of a first cyclone. His disclosure provides essentially that in the second cyclone at its base end there is a transverse baffle. At this point liquid is introduced to produce counter-flowing vortices, as a result of which a stream is formed in the second cyclone to push back up about the baffle and through the first cyclone to theoretically carry light particles which tend to exit from the first back to and through the first cyclone. This of course did not contemplate the idea of using a sectionalized cylone an intermediate portion of which would provide for an axially extended elutriation chamber. Moreover, Fontein in the use of his coupled cyclones did not at all consider the use of an axially extended elutriation chamber of the nature here contemplated wherein there are downwardly inclined slots for circulating elutriation fluid in a manner to maintain the original flow pattern of the hydrocyclone. Fontein also designated his receiver cyclone as having a shallow cylindrical portion incorporating the aforementioned baffle, the form and substance of which negatives any proper anticipation of the present invention.

At other times in the prior art other patents have contemplated the introduction of additional liquid in a cyclone but neither in a manner nor producing the unobvious results achieved by the presently described invention.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention I claim:

1. A hydrocyclone type separator comprising a separating cone formed in mating sections, said sections including at least a base section and a nozzle section having substantially the same angle of slope, means connected to the base end of said base section forming a base closure for said separator having an overflow opening on the central axis of said cone, means connected to provide for a tangential inflow of a liquid suspension to said base section in a manner to cause the suspension to move through said cone in a vortiginous flow and to create thereby an interior counterflow, a tubular shell positioned intermediately of the mating ends of said base and nozzle sections, said shell being axially elongated to produce a substantial spacing of said base and nozzle sections and having a cylindrical form throughout the major extent of its length which terminates at one end in a relatively short transition section of relatively reducing cross-section, means coupling the one end of said tubular shell remote from said transition section to the reduced end of said base section to position this reduced end in an adjacent but laterally spaced relation to the wall of said tubular shell, the reduced end of said transition section being connected to said nozzle section and defining an opening the cross-section of which corresponds to that of the opening formed at the larger end of said nozzle section, said shell defining thereby an elongated cylindrical elutriation chamber, means provided in connection with said shell for inflow thereto of elutriation fluid at least about the opening from the reduced end of said base cone section and at a downward inclination to the longitudinal axis of said cone to join in the natural flow pattern of the expanding vortex of said suspension created as the suspension exits from said base section to said elutriation chamber with minimum disturbance to said flow pattern, the expanded vortex being maintained thereby in moving the length of the cylindrical elutriation chamber until immediately in advance of said nozzle section it is recompressed in movement through said transition section, in the process of which their occurs a dilution of the suspension in a manner to produce an optimal transition of clean liquid and usable particles of said suspension to said interior counterflow.

2. A separator as in claim 1 characterized in that the reduced or apex end of said base cone section is so connected to project axially into said shell, in spaced relation to the sides thereof, and in that said means providing for inflow of elutriation fluid is located immediately adjacent the terminus of said apex end of said base section, said shell beginning in advance of the last said inflow means and extending a substantial distance therebeyond to enable an established diluted flow in said shell and adequate opportunity for separation of usable particles from said suspension prior to reaching the end of said shell forming said transition section.

3. A separator as in claim 1 wherein the overflow opening in said base closure means is defined by an overflow nozzle the outer wall of which is tapered and relatively expanded about its innermost end which defines the opening to said nozzle.

4. A separator system including the structure as set forth in claim 3 characterized by said nozzle section having means at its discharge end defining an underflow nozzle and means submerging said underflow nozzle in a body of liquid.

5. A separator system as in claim 1 characterized by an overflow nozzle defining the opening in said base closure means having a wall section which is relatively expanded at the entrance thereto and means providing for a contained body of fluid having submerged therein means at the reduced end of said nozzle cone section defining the rejects discharge opening from said separator.

6. A separator as in claim 1 wherein said shell is formed with a plurality of angled openings providing means for tangential inflow of elutriation fluid to said elutriation chamber to join said natural flow pattern of said expanded vortex, said angled openings being spaced longitudinally of said shell.

7. A separator as in claim 1 characterized by said means in connection with said shell for inflow thereto of elutriation fluid being comprised of means in connection with said shell providing thereon an exterior chamber having means for connection thereto of elutriation fluid, there being openings from this chamber through the wall of said shell which are spaced longitudinally of said shell and inclined commonly to discharge the elutriation fluid into said normal flow pattern of the expanded vortex in said chamber at angles on the order of 20° to the axis of said chamber.

References Cited

UNITED STATES PATENTS

| | | | |
|---|---|---|---|
| 2,100,487 | 11/1937 | Marsden | 285—231 X |
| 2,590,691 | 3/1952 | Fontein | 209—211 X |
| 2,610,737 | 9/1952 | Eder | 209—211 X |
| 2,794,832 | 6/1957 | Rietema | 209—211 X |
| 2,829,771 | 4/1958 | Dahlstrom | 209—211 |
| 3,025,965 | 3/1962 | Bergman | 209—211 X |
| 3,035,697 | 5/1962 | Koch | 209—211 X |
| 3,039,608 | 6/1962 | Wikdahl | 209—211 |
| 3,101,313 | 8/1963 | Woodruff | 209—211 |
| 3,130,157 | 4/1964 | Kelsall | 210—512 |

FOREIGN PATENTS

| | | |
|---|---|---|
| 1,037,980 | 5/1953 | France. |

FRANK W. LUTTER, *Primary Examiner.*